United States Patent
Mummert et al.

(10) Patent No.: US 6,427,152 B1
(45) Date of Patent: Jul. 30, 2002

(54) SYSTEM AND METHOD FOR PROVIDING PROPERTY HISTORIES OF OBJECTS AND COLLECTIONS FOR DETERMINING DEVICE CAPACITY BASED THEREON

(75) Inventors: Lily Barkovic Mummert, Mahopac; William G. Pope, Somers, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/457,467

(22) Filed: Dec. 8, 1999

(51) Int. Cl.[7] .............................................. G06F 17/00
(52) U.S. Cl. ..................................................... 707/102
(58) Field of Search ............................. 707/102; 705/28

(56) References Cited

U.S. PATENT DOCUMENTS

| | | | | |
|---|---|---|---|---|
| 4,422,171 A | * | 12/1983 | Wortley et al. | 714/748 |
| 5,546,315 A | * | 8/1996 | Kleinschnitz | 700/218 |
| 5,636,139 A | * | 6/1997 | McLaughlin el tal. | 359/118 |
| 5,678,042 A | * | 10/1997 | Pisello et al. | 707/10 |
| 5,790,176 A | * | 8/1998 | Craig | 725/106 |
| 5,909,638 A | * | 6/1999 | Allen | 455/6.1 |
| 5,926,799 A | * | 7/1999 | Robinson | 705/28 |
| 6,182,111 B1 | * | 1/2000 | Inohara et al. | 707/10 |
| 6,182,133 B1 | * | 1/2000 | Horvitz | 707/8 |
| 6,148,291 A | * | 11/2000 | Radican | 705/22 |
| 6,161,183 A | * | 12/2000 | Saito et al. | 380/282 |
| 6,330,572 B1 | * | 12/2000 | Sitka | 707/100 |
| 6,345,256 B1 | * | 2/2001 | Milsted et al. | 705/1 |
| 6,263,359 B1 | * | 7/2001 | Fong et al. | 709/100 |
| 6,341,271 B1 | * | 1/2002 | Salvo et al. | 705/28 |

* cited by examiner

Primary Examiner—Wayne Amsbury
(74) Attorney, Agent, or Firm—David M. Shofi; Anne Vachon Dougherty

(57) ABSTRACT

A system and method for managing storage resources in a computer system. The invention periodically tracks and stores the history of each object stored in the storage resources. For each storage container, the life expectancy is calculated by utilizing the object histories for all objects currently stored in that container.

29 Claims, 4 Drawing Sheets

[300] Calculating Life Expectancy for a Container

Fig. 2: Collect Object History

Fig. 3: Construct Container Utilization History

SYSTEM AND METHOD FOR PROVIDING PROPERTY HISTORIES OF OBJECTS AND COLLECTIONS FOR DETERMINING DEVICE CAPACITY BASED THEREON

FIELD OF THE INVENTION

The invention relates generally to the field of computer system storage and more particularly to a system and method for providing property histories of objects for more accurate forecasting of computer system storage capacity.

BACKGROUND OF THE INVENTION

In the capacity planning process for computer system storage, data is collected on the use of storage in the environment, the data is analyzed to predict the future utilization of the container, and system states are defined (e.g., thresholds) that trigger actions to prevent containers from filling to their limits. The current practice of storage capacity planning collects information from the storage environment only about the utilization of containers without regard for their content. That is, when observations of the containers are made, the content of the container (i.e. objects residing in the container) is ignored. The size of each object in the storage environment is also not recorded or retained as the size history of that object. Likewise, predictions about future utilization are based on containers rather than individual objects; even though additions and deletions of individual objects and changes to objects can affect the utilization of the container.

Current storage capacity planning practices use a percent utilization threshold to initiate action. For example, if the container is projected to reach 90% utilization, then action must be taken. The growth rates of utilization of containers, however, may vary significantly. If the combined growth of the size of objects now in a container is rapid, then the utilization threshold may not allow enough time to act. On the other hand, if the growth is very slight, then a static threshold may be very aggressive and cause undue action.

It is, therefore, an object of the present invention to provide a system and method for maintaining a historical record of individual objects residing on computer storage.

It is another object of the invention to provide an improved method for forecasting computer storage capacity by utilizing historical records of individual objects residing on the computer storage.

SUMMARY OF THE INVENTION

These and other objects are realized by the present invention comprising a system and method for managing storage resources in a computer system. The invention periodically tracks and stores the history of each object stored in the storage resources. For each storage container, the life expectancy is calculated by utilizing the object histories for all objects currently stored in that container.

BRIEF DESCRIPTION OF THE DRAWINGS

The invention will now be described in greater detail with specific reference to the appended figures wherein.

DETAILED DESCRIPTION OF THE PREFERRED EMBODIMENT

Figure 1:
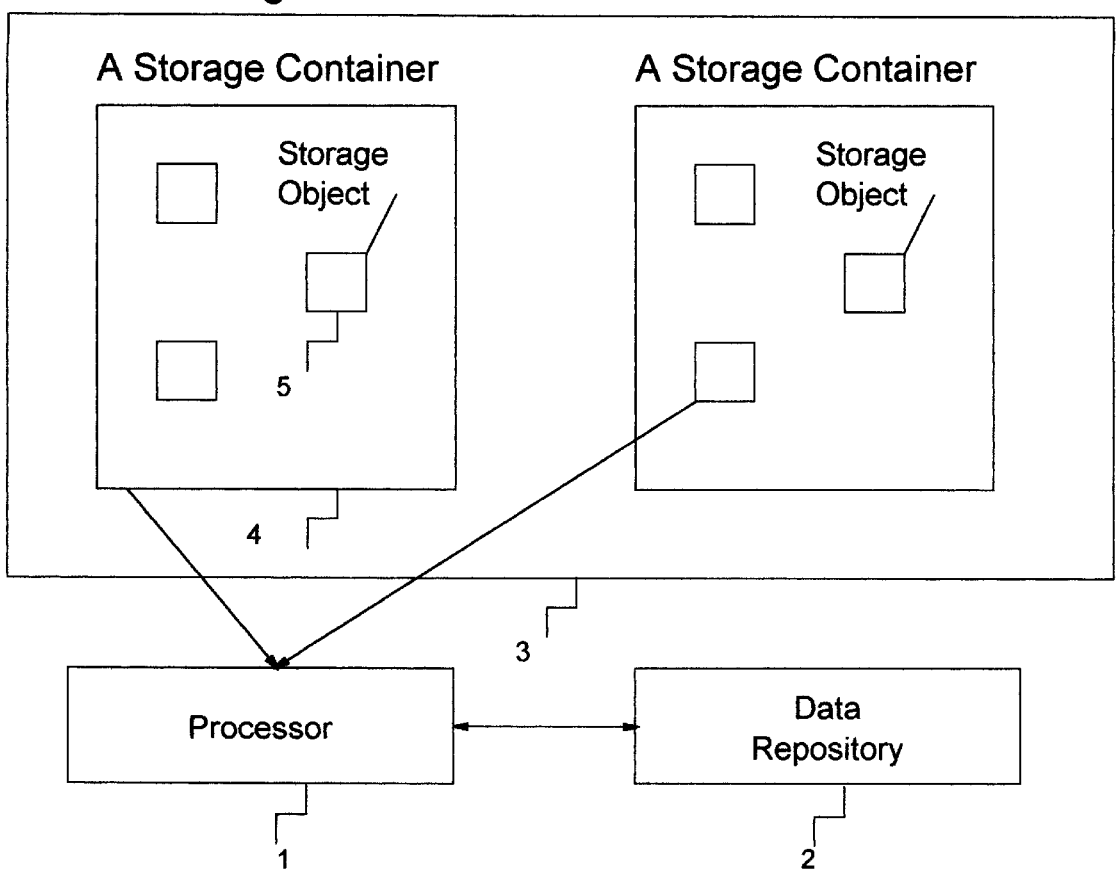
FIG. 1 provides a schematic drawings of a system in accordance with the present invention.

This invention is directed towards managing storage resources in a computer system. In an environment in which the use of storage grows rapidly, administrators and capacity planners require information on growth to prevent service outages caused by storage filled to capacity, and to balance resource usage across multiple storage devices. For purposes of the ensuing description, the following glossary of terms may assist in a complete understanding of the invention:

A processor is a computer system with the capability to execute computer software and programs. Here the term processor refers to central processing unit along with the memory and input/output interfaces for transferring digital data between the inside of the system and the outside world. It does not include any devices for the permanent storage of data. Also included is the operating and support software, i.e. operating system and support subsystems that allow the hardware devices to be used.

Storage generically means those devices used to permanently store and retrieve digitized data where the data can be overwritten and the storage can be reused.

A storage system is the physical storage device, related devices and methods, connection hardware between the processor and storage, any intermediate mechanisms that function in the transfer of data between processors and storage, and software that is used to identifying and managing stored data.

A storage environment of a processor is the set of one or more storage systems where the processor can read and/or write data permanently into storage.

A storage object is an identified collection of digital data which is kept together within the storage subsystem and has a name (identifier) unique to the storage subsystem. In most computer systems, this is called a file or a table in relational database systems. A storage object has an external property which is the amount of storage necessary to contain the object and is called the size of the objects, usually measure in bytes of data. The storage subsystem maintains the association of the objects name with the area of storage where the object resides. The processor access and updates the object by reference to the object's identifier. Over time, the object can be stored in different locations of the storage subsystem without impacting the processor's ability to access the object. Storage objects can be also be a collection of smaller storage entities managed by the storage subsystem. For example, in many UNIX systems, users files are collected together into volumes rooted in the file system at names like /home/user. This collection is always, in practice, kept together and the collection would be moved as an single object. Therefore the collection can be considered an object and the aggregate size of the collection is the size of the object.

A container is a generalized term that represents an identifiable and limited part of storage subsystem. The limit is measured in the same unit as the storage objects. In some systems a container is a physical direct access storage device (DASD). However, a physical drive can be divided into two or more logical containers called partitions (as in UNIX, among other systems). Other storage systems can combine several physical disk drives to for a file system (as in the AIX logical volume group). In either case, there is a limit which cannot be exceeded without external intervention in the operation of the processor interacting with the storage subsystem. A storage subsystem has one or more storage containers and each container can hold zero or more storage objects up to but not exceeding its limit. The processor has access to the storage subsystem(s) in its storage environment. Through the storage subsystems, it can identify all the containers in each subsystem and the limits of those containers and it can identify all the objects in each container and the size of each object.

A repository is a means for storing structured data external to the processor. Data in the repository is saved and accessed in a storage subsystem but is also supported by software, such as relational database software, that provides access to the structure of the data. Database software is not essential for a repository as the content of the repository can be stored in simple storage objects, frequently called a flat file.

Free space represents the amount of storage in a container that does not hold objects and is available to store new objects or allow for the expansion of existing objects.

The capacity of a container is its storage limit. The capacity of a storage subsystem is the sum of the limits of each container within the subsystem. The capacity of a storage environment is the sum total of the capacity of all storage subsystems within the environment.

Utilization of a container is the sum total of all the sizes of the objects in the container plus any storage used to manage and identify the storage objects (like directory space in UNIX systems). Utilization of a subsystem is the sum of the utilization of each container in the subsystem and utilization of the environment is the sum of the utilization of all subsystems within an storage environment. Utilization is usually expressed as a percentage of the capacity of the container.

Capacity planning is the process of projecting and managing utilization of a storage environment by projecting and managing the subsystems and containers within the environment. Capacity planning is depicted by three high level steps: (1) collecting information about the storage environment, (2) projecting the state of the storage environment at some time in the future, and (3) defining actions to prevent the utilization of any container reaching the container's limit. Although a single snapshot of the storage environment can be used for projecting, the projections are usually done using historical information. This invention addresses the methods used in steps (1) and (2).

A threshold is an artificial limit on utilization that is used by the capacity planning process to prioritize containers that need action. When the projected utilization of a container exceeds the threshold, the container is selected by the process to be managed and actions will be defined (in step 3).

The life expectancy of a container is the period of time that the utilization of the container is expected to be less than the capacity of the container. If the utilization of the container is projected to always be less than the capacity, that is the projected change in utilization is constant or diminishing, then the life expectancy of the container is expected to be infinite. Under other conditions, where the life expectancy is limited, the capacity planning process must identify actions that prevent the container from filling up.

Action horizon is the period of time needed to take action to change a storage subsystem.

Two aspects of this invention extend and improve the current state of the art in storage capacity planning. First, this invention calls for the recording of the size of individual storage objects in the environment and saving the size information in a location-independent way. Storage objects can move between containers. Therefore, the life span of an object may exceed the time period that it resided in its current container. Recording the history of an object, regardless of where it resided, provides accurate information of the size of that object in the past. Second, this invention projects container utilization based on the histories of the individual objects currently residing in the container. These histories are combined to create a history of the utilization of the container as if it had, in the past, only held the current inventory of objects. In this way, the errors inherent from the previous addition and deletion of objects is eliminated. Since the history of the objects can be longer than their residency in their current container, there are more observations with which to make a projection. The combination of the combining of histories and the added length of the histories may result in more accurate projections of future utilization of the container. More accurate projections allow for the more accurate management of storage environments.

The figure of merit used by this invention is life expectancy. Life expectancy takes into account not only the current utilization of the container but also the growth in utilization, if the utilization in increasing over time. Life expectancy normalizes the projection to the same dimension for all containers and it projects, in the same unit, as the lead time needed to take preventive action. The threshold in the process is set to the time (e.g., days) needed to take preventive action (the action horizon). The life expectancy of each container is compared with the time horizon threshold and those containers that fall below the threshold are singled out for action. This benefits the storage capacity planning process in two ways. First, effort on containers with slow growth can be deferred, saving effort and interruption to the storage system. Second, containers with rapid growth are identified and singled out for action, thus preventing emergency action and/or system failure. Using life expectancy makes the comparison of the action horizon and the change in the container utilization more accurate and less prone to error than conventional methods.

FIG. 1 provides an illustration of a system where this invention would apply. Processor 1 includes a computer process in accordance with the invention. The processor would have access to a data repository 2, such as a relational database, wherein data are saved and retrieved when needed. The processor also has access to data about properties of the storage environment 3 of the computing installation and about objects that are part of the storage environment. The objects of interest for this invention are containers 4 that exist in the storage system, such as a file system. A container stores data objects 5, such as computer files.

Figure 2:
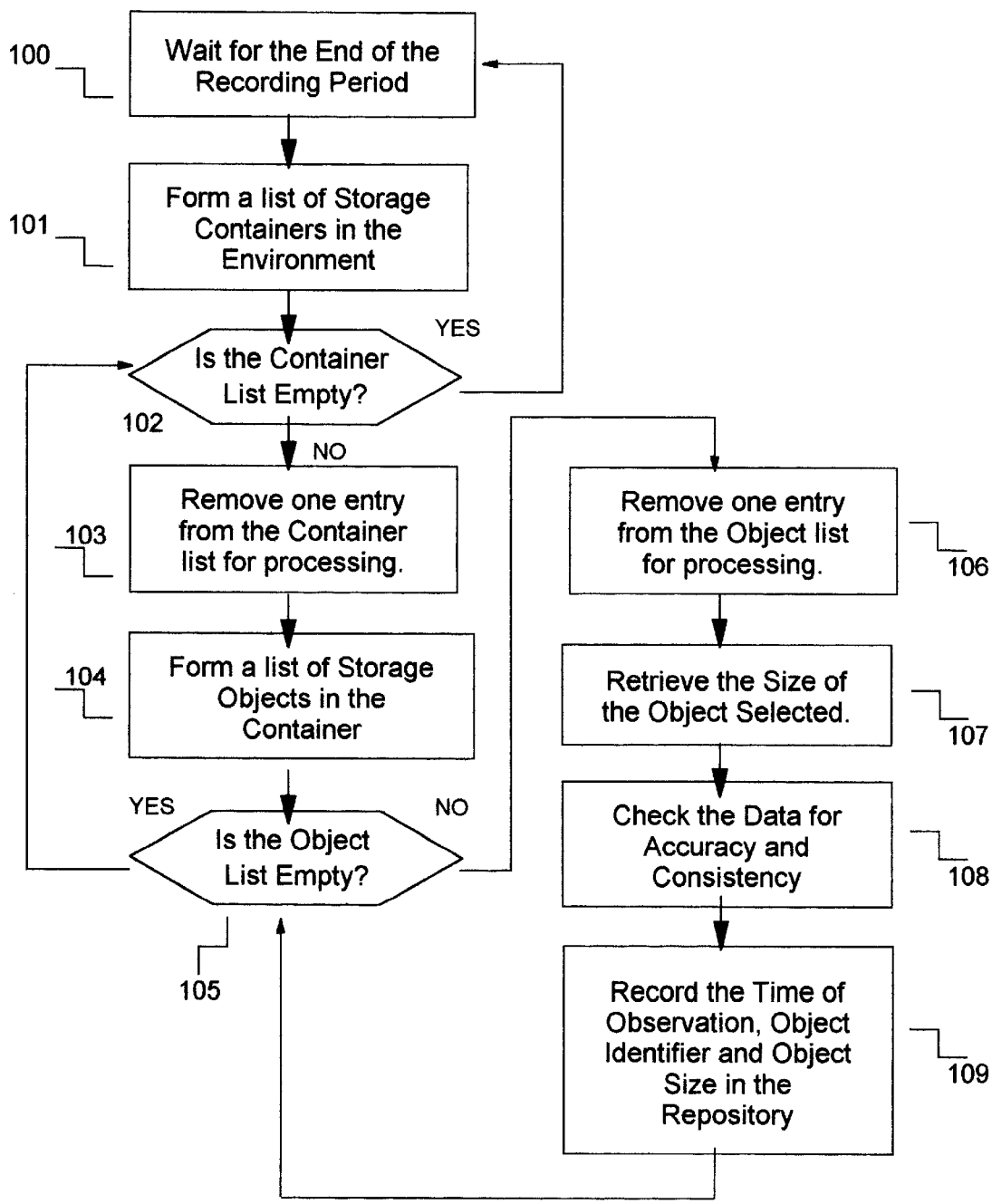
FIG. 2 provides a representative process flow for collecting object histories.

Each container has a unique identifier called the container name. A container j also has a limit ($L_j$), called the container size, on the number of bytes of information that the container can hold. Objects 5 stored in the container also each have an identifier that is unique within the environment 3. Each storage object i uses some amount of storage space ($S_i$), measured in bytes, in the container where they are currently stored. The size of storage objects can change over time ($S_i(t)$) with the object taking more or less space in the container, where t represents some point in time. Objects can be moved from one container to another, but they retain their unique identifier. Storage in the container that is not occupied by objects is called free space ($F_j$). Free space of a container j is calculated by subtracting the sum of the sizes of all the objects in j from the size limit of the container $L_j$:

FIG. 2 details how object histories are collected. An object history is the record of the size of a specific object over time, $S_i(t)$. It is preferred that object history information be collected periodically; therefore, at the end of a time period shown at 100, the collection process begins. At 101, a list of all the containers in the environment is developed dynamically by searching the storage environment for storage objects. The process then loops through the list of containers until all objects in all containers have been processed via steps 102–109. One at a time, each container name is selected from the container list, at 103, for processing to update the history of objects within that container. A list of objects in the container is created at 104. Unless the object list is empty, as determined at step 105, the inventive process loops through the list of objects in the selected container until all the objects have been processed by steps 106–109. First, at 106, the name of the object is selected from the list. Next, the size of the object is determined at 107. Thereafter, the names and the size are checked for accuracy (for example, the size cannot be negative) at step 108. Finally, the data (time of the observation, identifier of the object, and its size) for this object are recorded in the data repository 2 at step 109. Once all of the objects in the list for the selected container are processed, as indicated by a "yes" answer at step 105, then the process returns to step 102. If, as determined at step 102, the container list is empty, such that the histories for all objects in all containers have been updated, then the process returns to the beginning, i.e., step 100, to wait until the end of the next time period.

Figure 3:
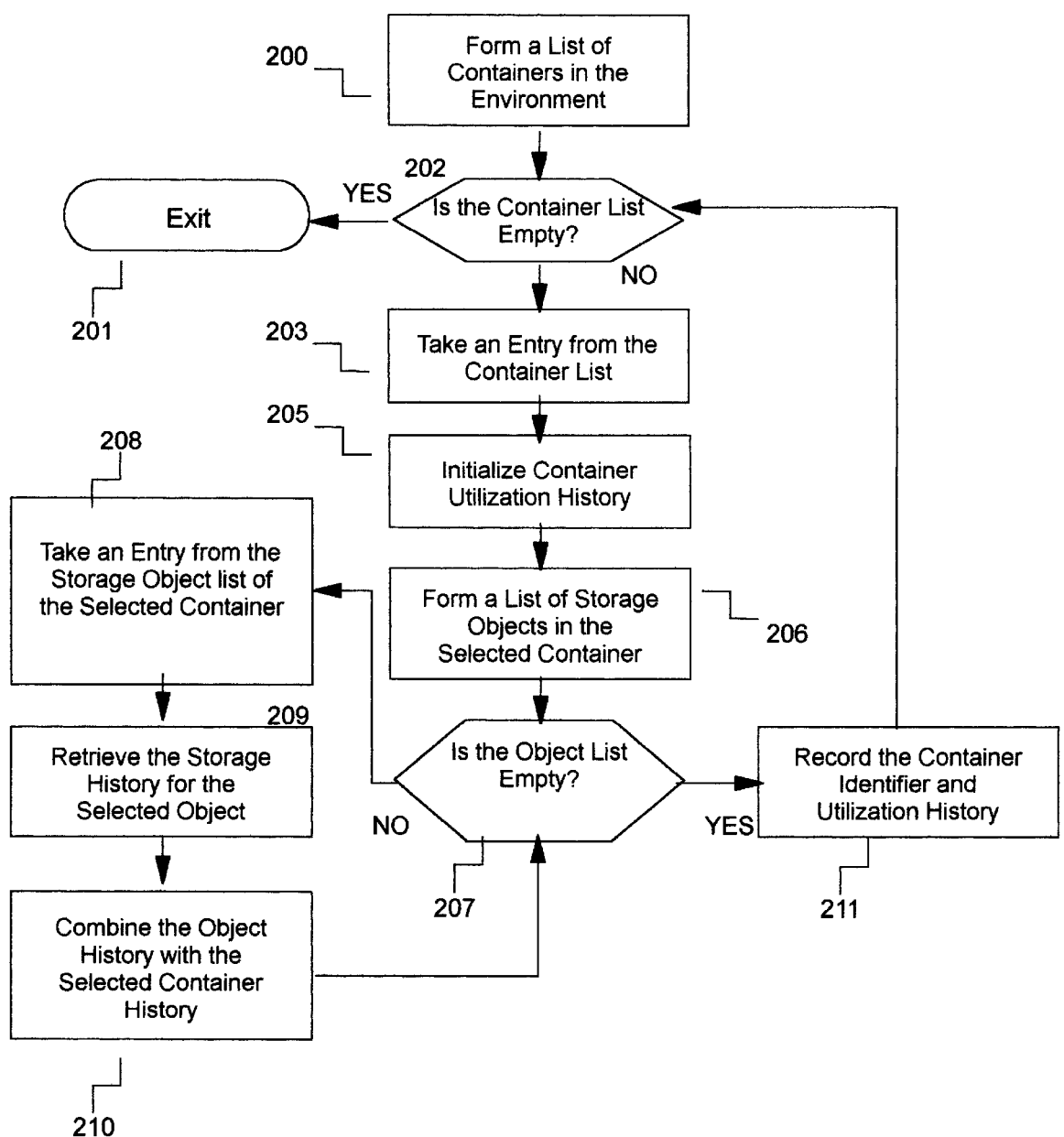
FIG. 3 provides a representative process flow for constructing a container utilization history.
Figure 4:
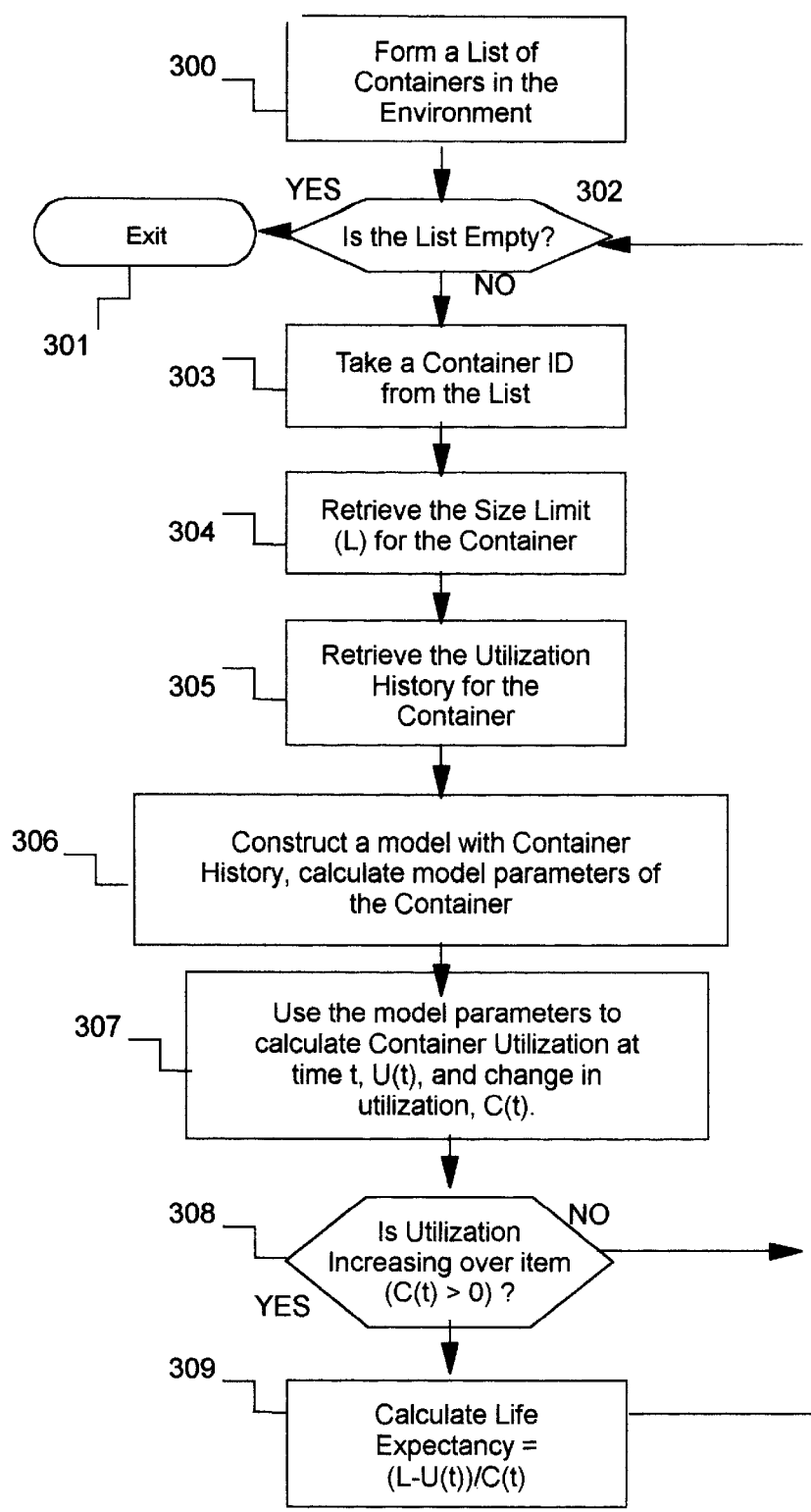
FIG. 4 provides a representative process flow for calculating the life expectancy for a container.

FIG. 3 details how the container utilization history is constructed in steps 200 through 211. First, a list of containers in the environment is created at step 200. First, a name of a container is selected from the container list at 203. Next, at step 205, the utilization history for the container is initialized with the identifier of the container and an empty vector for the utilization history. The empty vector will later be replaced with the combined histories of the objects currently held in the container. A container utilization history is a matrix with two columns, with the first column representing a time period and the second column representing the utilization of the container. The length of the container history is a parameter, which need not coincide with the history of any particular object in the container. Utilization is defined as the sum of the size of the objects in the container at time t, $U_j(t)=\Sigma_{v_i \epsilon j} S_i(t)$) After the matrix has been initialized, a list of the names of the objects currently stored in the container is obtained at step 206, for example by referencing a directory or inspecting the container, as discussed above with reference to steep 101 of FIG. 2. The process then loops through the list of objects until all have been processed by steps 207–210. Once it has been determined, at step 207, that the object list is not empty, then one item is selected from the object list at step 208. The identifier of the object is used to retrieve the history of that object from the repository in step 209. That retrieved object history is combined with the utilization history of the container at step 210. This is done by adding the size of the object at each point in time represented in the utilization matrix from 205. It may be necessary to interpolate the size if the history of the object and the utilization history time periods do not coincide. For any time periods in the container utilization history for which there are no object history observations, no updates are made to the utilization history. Any time periods that extend back before the beginning of the container utilization history are ignored. When the object list is exhausted, as determined at step 207, the utilization history along with the identifier of the container is written back to the repository at step 211. The utilization history of the container now represents a combined history of all the objects that are currently stored in the container, without regard to where those objects were stored at previous times.

The final part of the invention is the calculation of the life expectancy for each container. The life expectancy is defined as the projected amount of time remaining before the container is full, if the change in the cumulative size of the objects in the container over time is increasing. This is calculated as illustrated in step 300–309. The list of containers in the environment is formed at step 300. The loop comprising steps 302–309 processes all the containers in the list. First, once it is determined that there is an entry in the list, at step 302. At step 303, a container identifier is selected from the list. Next, the current size limit of the container is determined ($L_j$) at step 304. Then, the utilization history for the container is retrieved from the repository at 305. A model of the change in utilization is constructed and parameters of the model are calculated at 306. Two values are projected from the model at step 307: the utilization of the container at time t as projected by the model, $U_j(t)$, and the rate of change in utilization, $C_j(t)$. Note that a variety of modeling techniques could be used to forecast storage usage within the scope of this invention. If the change in utilization over time is positive, as determined at step 308, then the utilization is growing and the container will eventually fill. The calculation of life expectancy can be represented by the general formula $E_j(t)=\{L_j,U_j(t),C_j(t)\}$. Under the conditions of linear growth, the life expectancy for container j at time t is calculated, at step 309, by the formula $E_j(t)=(L_j-U_j(t)/C_j(t))$. The life expectancy metric combines resource utilization, growth in utilization, and capacity constraints into a single, intuitive, device- and system-independent measure. Computing life expectancy requires historical data on resource usage and a means to forecast future usage, but the metric is independent of the forecasting method. Traditionally resource usage is monitored in aggregate, at the container level. If the contents of the container (i.e., objects) can change over time, keeping historical resource usage data on objects is required to accurately compute life expectancy. When employing the current invention, the life expectancy of a container is a more accurate measure due to the fact that the life expectancy reflects the objects currently residing within it.

The description of this invention is expressed entirely for a storage environment, but the methods and system have broader application. The application of this invention is easier to express for a storage environment because the storage limits (capacity) and the object sizes are easily identified. However, other environments have similar limits and utilization with the same three step capacity planning process.

To apply this invention to other environments, the identification of containers, objects, limits and sizes must be translated into the new environment. For example, to apply this invention to the execution capacity of a computer system, we would use a measure of CPU power, such as instructions per second. Each computer system (a container) would be assigned a limit (the capacity of the system) and the CPU usage of each user or computer job would be recorded. As users or jobs can be assigned to different computer systems, the history of their usage would be combined as with storage objects, to provide a projects of usage. This projection, along with the CPU capacity is used to define a life expectancy for the CPU capacity of the system. The same concept can be applied to network bandwidth where the capacity is the total number of bits that can pass through a network link, which is the analog of the container in this model. History of each user traffic on the link is recorded and the capacity of the link can be managed in a fashion similar to system storage or CPU time. Other applications of the model can be identified whenever the essential elements of container(s), their capacity, the identifiable objects in the containers and their resource usage can be recorded. The invention has been described with reference to preferred embodiments. One having skill in the relevant art will recognize that modifications can be made without departing from the spirit and scope of the invention.

Having thus described the invention, the inventors seek to obtain Letters Patent on the following:

1. A method for collecting the history for each of a plurality of objects stored in at least one container in a storage environment, comprising the steps of:

for each of said objects stored in said container, determining the size of the object;

verifying the object name and the size for each of said objects stored in said container; and storing object data comprising the object name, size, and current time for each of said objects stored in said container.

2. The method of claim 1 wherein the storage environment comprises a plurality of containers, further comprising the steps of:

repeating the selecting, obtaining, determining, verifying and storing steps for each successive container in said storage environment.

3. The method of claim 2 wherein said steps are conducted periodically.

4. The method of claim 1 wherein said steps are conducted periodically.

5. A method for collecting the history for each of a plurality of objects stored in at least one of a plurality of containers in a storage environment, comprising the steps of:

constructing a list of all the containers in the environment;

selecting a first container from the container list;

obtaining a list of objects stored in said first container;

for each of said objects stored in said first container, determining the size of the object;

verifying the object name and the size for each of said objects stored in said first container;

storing object data comprising the object name, size, and current time for each of said objects stored in said first container; and repeating the selecting, obtaining, determining, verifying and storing steps for each successive container in said container list.

6. The method of claim 5 wherein said steps are conducted periodically.

7. A method for constructing a container utilization history for a storage container environment comprising the steps of:

creating a container list of containers in the environment;

selecting a name of a container from the container list;

ascertaining the size limit of the container ($L_j$); and creating a utilization history for said container.

8. The method of claim 7 wherein said creating a utilization history for said container comprising the steps of:

obtaining a list of objects stored in said container;

selecting a first object from said list of objects;

retrieving the history of said first object;

adding said history to said utilization history for said container;

selecting a successive object from said list of objects;

retrieving the history of said successive object; and adding said history of said successive object to said utilization history of said container; and repeating said selecting retrieving and adding for each successive object in said container.

9. The method of claim 8 wherein said creating a utilization history comprises constructing a matrix comprising two columns, with the first column representing a time period and the second column representing the utilization of the container.

10. The method of claim 7 further comprising selecting a name of each successive container in the container list and repeating said creating of utilization history for each successive container.

11. The method of claim 7 wherein said creating a utilization history comprises constructing a matrix comprising two columns, with the first column representing a time period and the second column representing the utilization of the container.

12. A method for calculating the life expectancy for a container comprising the steps of:

forming a fist of containers in the environment;

selecting a container from the list;

determining the size for said container;

retrieving the utilization history for the container based on the objects currently stored in the container; and projecting the utilization of the container at time t based on the current utilization and the container size.

13. The method of claim 12 wherein said projecting comprises the steps of:

constructing a model of the change in utilization;

calculating parameters of the model; and projecting the utilization of the container at time t as projected by the model, $U_j(t)$, and the rate of change in utilization, $C_j(t)$.

14. The method of claim 12 where the life expectancy for containers at time t is calculated by the formula $E_j(t)=(L_j-U_j(t)/C_j(t))$.

15. A program storage device readable by machine, tangibly embodying a program of instructions executable by the machine to perform method steps for constructing a container utilization history for a storage container environment, said method steps comprising:

creating a container list of containers in the environment;

selecting a name of a container from the container list;

ascertaining the size limit of the container ($L_j$);

creating a utilization history for said container obtaining a list of objects stored in said container;

selecting a first object from said list of objects;

retrieving the history of said first object;

adding said history to said utilization history for said container; and creating a utilization history with object histories for each successive container in said environment.

16. A program storage device readable by machine tangibly embodying a program of instructions executable by the machine to perform method steps for collecting the history for each of a plurality of objects stored in at least one container in a storage environment, comprising the steps of:

for each of said objects stored in said container, periodically determining the size of the object;

verifying the object name and the size for each of said objects stored in said container; and storing object data comprising the object name, size, and current time for each of said objects stored in said container.

17. A program storage device readable by machine, tangibly embodying a program of instructions executable by the machine to perform method steps for calculating the life expectancy for a container comprising the steps of:

forming a list of containers in the environment;

selecting a container from the list;

determining the size for said container;

retrieving the utilization history for the container based on the objects currently stored in the container; and projecting the utilization of the container at time t based on the current utilization and the container size.

18. A computer system comprising:

a storage environment comprising a plurality of containers for storing objects; and a utilization history component for maintaining a utilization history for each of said plurality of containers in said storage environment based on the objects currently stored in each of the containers.

19. The system of claim 18 further comprising a projection component for projecting the life expectancy of each of said plurality of containers based on the utilization history.

20. A method for calculating the life expectancy for a computer entity comprising the steps of:

determining the capacity of the computer entity;

retrieving the utilization history for the computer entity based on the utilization by users currently accessing the computer entity; and projecting the utilization of the computer entity at time t based on the current utilization and the capacity.

21. The method of claim 20 further comprising the steps of:

creating a plurality of user utilization histories, one for each user; and combining the plurality of user utilization histories to obtain the utilization history of the computer entity.

22. The method of claim 21 wherein the computer entity is a computer and the capacity comprises a CPU utilization limit.

23. The method of claim 20 wherein the computer entity is a web server and the capacity comprises the maximum number of HTTP requests that the server can sustain.

24. The method of claim 23 wherein the utilization history of the computer entity comprises the combination of histories of a plurality of web pages stored on the web server.

25. A computer system comprising:

a processing component comprising a plurality of CPUs for performing processing; and a utilization history component for maintaining a utilization history for each of said plurality of CPUs based on the users currently accessing each of the CPUs.

26. The system of claim 25 further comprising a projection component for projecting life expectancy of said processing component based on the utilization histories of said CPUs and a capacity measure for said processing component.

27. A web server comprising:

a server component comprising a plurality of web pages accessible by users through communication with said server component; and a utilization history component for maintaining a utilization history for each of said web pages based on user accessing of said page.

28. The web server of claim 27 further comprising a projection component for projecting life expectancy of said web server based on the utilization histories of said web pages.

29. A program storage device readable by machine, tangibly embodying a program of instructions executable by the machine to perform method steps for calculating the life expectancy for a computer entity, said method steps comprising:

determining the capacity of the computer entity;

retrieving the utilization history for the computer entity based on the utilization by users currently accessing the computer entity; and projecting the utilization of the computer entity at time t based on the current utilization and the capacity.

* * * * *